US012207357B2

(12) United States Patent
Gupta et al.

(10) Patent No.: US 12,207,357 B2
(45) Date of Patent: Jan. 21, 2025

(54) METHODS AND SYSTEMS FOR HANDLING ENCODING OF RADIO CAPABILITY SIGNALLING INFORMATION OF UE USING RACs

(71) Applicant: Samsung Electronics Co., Ltd., Suwon-si (KR)

(72) Inventors: Varini Gupta, Bangalore (IN); Anikethan Ramakrishna Vijaya Kumar, Bangalore (IN); Lalith Kumar, Bangalore (IN); Narendranath Durga Tangudu, Bangalore (IN); Fasil Abdul Latheef, Bangalore (IN); Himke Van Der Velde, Bangalore (IN); Kundan Tiwari, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 17/755,709

(22) PCT Filed: Nov. 6, 2020

(86) PCT No.: PCT/KR2020/015516
§ 371 (c)(1),
(2) Date: May 5, 2022

(87) PCT Pub. No.: WO2021/091309
PCT Pub. Date: May 14, 2021

(65) Prior Publication Data
US 2022/0386107 A1   Dec. 1, 2022

(30) Foreign Application Priority Data

Nov. 8, 2019   (IN) .............................. 201941045517
Jan. 7, 2020   (IN) .............................. 202041000658
Oct. 20, 2020  (IN) .............................. 201941045517

(51) Int. Cl.
*H04W 8/24*   (2009.01)
*H04W 88/18*  (2009.01)

(52) U.S. Cl.
CPC .............. *H04W 8/24* (2013.01); *H04W 88/18* (2013.01)

(58) Field of Classification Search
CPC ......... H04W 8/24; H04W 8/22; H04W 88/18; H04W 88/06; H04W 8/26
See application file for complete search history.

(56) References Cited

U.S. PATENT DOCUMENTS 10,524,166 B2   12/2019  Youn et al.
11,523,271 B1*  12/2022  Bertz ...................... H04W 8/24
(Continued)

FOREIGN PATENT DOCUMENTS

CN   103281749 A   9/2013
CN   109587678 A   4/2019
(Continued)

OTHER PUBLICATIONS

Office Action dated Jul. 19, 2023, in connection with Korean Patent Application No. 10-2022-7004856, 9 pages.
(Continued)

*Primary Examiner* — Congvan Tran

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

(Continued)

Methods and systems for handling encoding of radio capability information of UE using RACS. A method disclosed herein includes encoding radio capability information of a user equipment (UE) in formats of multiple radio access technologies (RATs) that have been supported by a public land mobile network (PLMN) in which the UE is registered. The method further includes assigning a radio capability identifier (RAC-ID) to the UE for signalling the radio capability information encoded in the multiple formats across the multiple RATs. The method further includes encoding the radio capability information in a specific format of the indicated RAT and assigning the RAC-ID to the UE for signalling the radio capability information and the associated encoding format.

16 Claims, 9 Drawing Sheets

(56) References Cited

U.S. PATENT DOCUMENTS

| | | | | |
|---|---|---|---|---|
| 2012/0057474 | A1* | 3/2012 | Hirano | H04W 36/24 370/248 |
| 2014/0219248 | A1* | 8/2014 | Reddiboyana | H04W 36/142 370/331 |
| 2014/0372557 | A1* | 12/2014 | Buckley | H04L 67/104 709/217 |
| 2018/0098255 | A1 | 4/2018 | Murugan et al. | |
| 2018/0146375 | A1* | 5/2018 | Pawar | H04W 12/062 |
| 2018/0227873 | A1* | 8/2018 | Vrzic | H04W 60/04 |
| 2019/0110190 | A1 | 4/2019 | Lieshout et al. | |
| 2019/0124181 | A1 | 4/2019 | Park et al. | |
| 2020/0053554 | A1* | 2/2020 | Kim | H04W 60/00 |
| 2020/0100236 | A1* | 3/2020 | Tenny | H04W 8/22 |
| 2020/0351646 | A1* | 11/2020 | Casati | H04L 41/0661 |
| 2022/0039178 | A1* | 2/2022 | Salkintzis | H04W 12/041 |
| 2022/0361028 | A1* | 11/2022 | Van Phan | H04W 4/44 |

FOREIGN PATENT DOCUMENTS

| | | |
|---|---|---|
| CN | 109792650 A | 5/2019 |
| WO | 2018/128529 A1 | 7/2018 |
| WO | 2018202138 A1 | 11/2018 |

OTHER PUBLICATIONS

Korean Intellectual Property Office, "Written Decision on Registration" dated Mar. 29, 2024, in connection with Korean Patent No. 10-2022-7004856, 6 pages.
Korean Intellectual Property Office, "Office Action" dated Jul. 19, 2023, in connection with Korean Patent No. 10-2022-7004856, 9 pages.
ZTE Corporation, Sanechips, "Consideration on UE radio capability ID signaling in inter-node RRC messages", 3GPP TSG-RAN WG2 Meeting#107bis, R2-1912672, Chongqing, China, Oct. 14-18, 2019, 5 pages.
Intel, "Resolution of Editor's Note on UCMF-AMF interaction", SA WG2 Meeting #S2-135, S2-1909798, Split, Croatia, Oct. 14-18, 2019, 5 pages.
Intel, "Resolution of Editor's Note on UCMF-AMF interaction", SA WG Meeting #S2-135, Oct. 14-18, 2019, S2-1909798, 5 pages.
ZTE Corporation et al., "Consideration on UE radio capability ID signaling in inter-node RRC messages", 3GPP TSG-RAN WG2 Meeting#107bis, Oct. 14-18, 2019, R2-1912672, 5 pages.
Apple, "UCMF Services update", SA WG2 Meeting #135, Oct. 14-18, 2019, S2-1909668, 2 pages.
Ericsson, "Complete RACS details", 3GPP TSG-CT WG3 Meeting #106, Oct. 7-11, 2019, C3-194435, 17 pages.
International Search Report dated Feb. 10, 2021 in connection with International Patent Application No. PCT/KR2020/015516, 3 pages.
Written Opinion of the International Searching Authority dated Feb. 10, 2021 in connection with International Patent Application No. PCT/KR2020/015516, 4 pages.
Intellectual Property India, "Examination report under sections 12 & 13 of the Patents Act" issued Dec. 3, 2021, in connection with Indian Patent Application No. 201941045517, 6 pages.
"3rd Generation Partnership Project; Technical Specification Group Services and System Aspects; Procedures for the 5G System (5GS); Stage 2 (Release 16)", 3GPP TS 23.502 V16.2.0 (Sep. 2019), 525 pages.
"3rd Generation Partnership Project; Technical Specification Group Services and System Aspects; System Architecture for the 5G System (5GS); Stage 2 (Release 16)", 3GPP TS 23.501 V16.2.0 (Sep. 2019), 391 pages.
Samsung, "Discussion on different radio capability octet values across RATs", SA WG2 Meeting #136AH, Jan. 13-17, 2020, S2-2000839, 2 pages.
Samsung, "RAT-Type in RACS Signaling", Change Request, 3GPP TSG-SA2 Meeting #136-AH, Jan. 13-17, 2020, S2-2000846, 4 pages.
Samsung, "RAT-Type in RACS Signaling", Change Request, 3GPP TSG-SA2 Meeting #136-AH, Jan. 13-17, 2020, S2-2000843, 4 pages.
Vodafone (based on work by Samsung), "URC Coding format in communications with UCMF", Change Request, SA WG2 Meeting #S2-137E, Feb. 24-28, 2020, S2-2002298, 4 pages.
Supplementary European Search Report dated Nov. 8, 2022 in connection with European Patent Application No. 20 88 5681, 27 pages.
Office Action dated Jul. 31, 2024, in connection with a counterpart Chinese Application No. 202080077559.8, 10 pages.
Nokia, et al. "Removing requirement that TAC+SV is used to identify UE model in manufacturer assigned ID", S2-1909489, 3GPP TSG-SA WG Meeting # 135, Split, Croatia, Oct. 2019, 3 pages.
Ericsson, "Format of capability information", 3GPP TSG-RAN WG2 #106, Reno, Nevada, US, May 2019, R2-1907341, 3 pages.

* cited by examiner

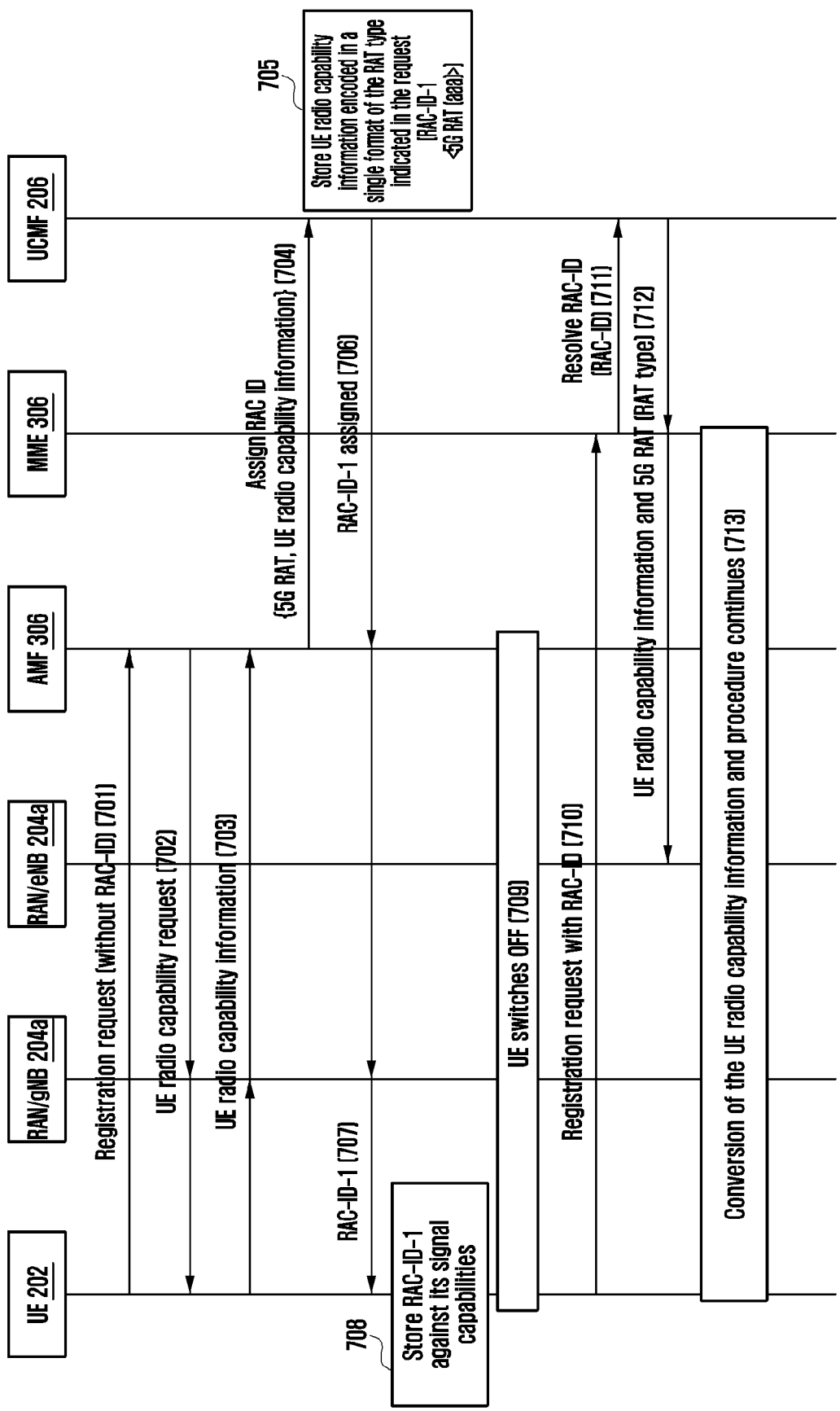

METHODS AND SYSTEMS FOR HANDLING ENCODING OF RADIO CAPABILITY SIGNALLING INFORMATION OF UE USING RACs

CROSS-REFERENCE TO RELATED APPLICATIONS

This application is a 371 of International Application No. PCT/KR2020/015516 filed on Nov. 6, 2020, which claims priority to India Patent Application No. 201941045517 filed on Nov. 8, 2019, India Patent Application No. 202041000658 filed on Jan. 7, 2020, and India Patent Application No. 201941045517 filed on Oct. 20, 2020, the disclosures of which are herein incorporated by reference in their entirety.

BACKGROUND

1. Field

The present disclosure relates to the field of wireless communication systems and more particularly to handling encoding of radio capability signalling information of a user equipment (UE) in a wireless communication system using radio capability signalling optimization (RACS).

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The principal object of the embodiments herein is to disclose methods and systems for handling encoding of radio capability signalling information/radio capability information of a user equipment (UE) in a wireless network using a radio capability signalling optimization (RACS) feature.

Another object of the embodiments herein is to disclose methods and systems for encoding the radio capability information of the UE in formats of multiple radio access technologies (RATs) that have been supported by the UE and assigning a radio capability identifier (RAC-ID) to the UE for signalling the radio capability information encoded in the multiple formats across the multiple RATs.

Another object of the embodiments herein is to disclose methods and systems for encoding the radio capability information in a specific format of the indicated RAT and assigning the RAC-ID to the UE for signalling the radio capability information and the associated encoding format.

SUMMARY

The embodiments herein provide methods, UE radio capability management function (UCMF) and network function (NF). A method performed by an user equipment radio capability management function (UCMF) in a wireless communication system, includes receiving, from a first network function (NF), user equipment (UE) radio capability information and at least one first radio access technology (RAT) type, wherein the at least one first RAT type is associated with at least one format for coding; assigning an UE radio capability identifier (ID) associated with the UE radio capability information and the at least one first RAT type; and transmitting, to the first NF, the UE radio capability ID. And a method performed by a network function (NF) in a wireless communication system, includes transmitting, to an user equipment radio capability management function (UCMF), user equipment (UE) radio capability information and at least one first radio access technology (RAT) type, wherein the at least one first RAT type is associated with at least one format for coding; and receiving, from the UCMF, an UE radio capability identifier (ID), wherein the UE radio capability ID associated with the UE radio capability information and the at least one first RAT type is assigned by the UCMF.

Accordingly, embodiments herein provide an user equipment radio capability management function (UCMF) in a wireless communication system, comprises a transceiver; and a controller configured to: receive, from a first network function (NF) via the transceiver, user equipment (UE) radio capability information and at least one first radio access technology (RAT) type, wherein the at least one first RAT type is associated with at least one format for coding, assign an UE radio capability identifier (ID) associated with the UE radio capability information and the at least one first RAT type, and transmit, to the first NF via the transceiver, the UE radio capability ID. And a network function (NF) in a wireless communication system, comprises a transceiver; and a controller configured to: transmit, to an user equipment radio capability management function (UCMF) via the transceiver, user equipment (UE) radio capability information and at least one first radio access technology (RAT) type, wherein the at least one first RAT type is associated with at least one format for coding, and receive, from the UCMF via the transceiver, an UE radio capability identifier (ID), wherein the UE radio capability ID associated with the UE radio capability information and the at least one first RAT type is assigned by the UCMF.

The RACS approach may reduce the overhead of signalling the radio capability information on the UE by assigning a unique identifier to the radio capability information of the UE. The unique identifier may be a RAC-ID. The UE may share the RAC-ID corresponding to its radio capability information over the various interfaces. The RACS approach may also provide a node (UE radio capability management function (UCMF)) for storing the radio capability information of the UE, assigning the RAC-ID to the radio capability information of the UE and resolve the RAC-ID assigned to the radio capability information of the UE.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which:

FIG. 7 is another example sequence diagram depicting encoding of the UE radio capability information for signalling over the various interfaces of the RATs, according to embodiments as disclosed herein;

DETAILED DESCRIPTION

Figure 1:
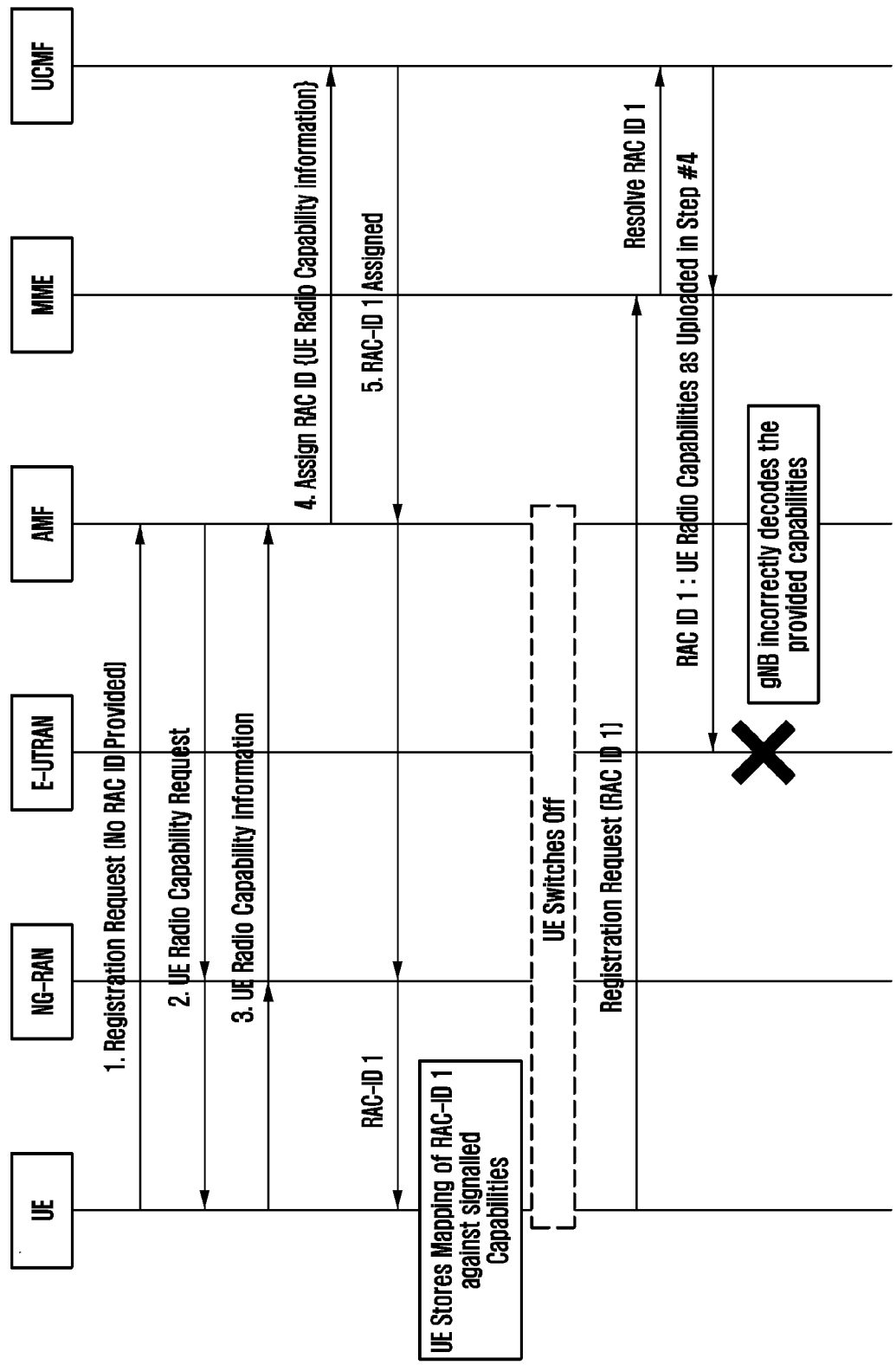
FIG. 1 is an example sequence diagram depicting a conventional method of encoding user equipment (UE) radio capability information.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

In a wireless communication system, radio capability signalling optimization (RACS) approach may be implemented to avoid an overhead of signalling radio capability information of a user equipment (UE) across various interfaces (for example: radio as well as non-radio interfaces). For example, within the wireless network, a new radio (NR)/5G core may request the UE to signal its radio capability information for a NR radio access technology (RAT), a 4G RAT or for any other supported RATs. Similarly, a 4G packet core may request the UE to signal its radio capability information for a 4G RAT, a NR RAT or for any other supported RATs.

However, size of such radio capability information may become very large and may consequently become an overhead for the UE to signal the radio capability information over the radio interfaces. The RACS approach may reduce the overhead of signalling the radio capability information on the UE by assigning a unique identifier to the radio capability information of the UE. The unique identifier may be a RAC-ID. The UE may share the RAC-ID corresponding to its radio capability information over the various interfaces. The RACS approach may also provide a node (UE radio capability management function (UCMF)) for storing the radio capability information of the UE, assigning the RAC-ID to the radio capability information of the UE and resolve the RAC-ID assigned to the radio capability information of the UE.

In conventional versions of 3GPP specifications, in case of a handover of the UE from a one RAT (source RAT) to another RAT (target RAT) or an idle-mode mobility, a radio access network (RAN) of the target RAT receives the RAC-ID from the UE, and downloads the radio capability information of the UE corresponding to the received RAC-ID from the UCMF. The RAN of the target RAT decodes the downloaded radio capability information to determine the radio capability information of the UE. The radio capability information of the UE may be uploaded into the UCMF by the source RAT. The RAN of the target RAT may decode the radio capability information of the UE corresponding to the received RAC-ID successfully, only when the source RAT and the target RAT are same. However, the decoding of the radio capability information of the UE corresponding to the received RAC-ID on the RAN of the target RAT may fail when the source RAT and the target RAT are different, since encoding of the radio capability information of the UE may be different from one RAT to another.

Consider an example scenario, as depicted in FIG. 1, wherein the UE initiates a registration with a 5G RAT. The UE sends a registration request to an access and mobility function (AMF) of the 5G RAT through a RAN (gNodeB (gNB)) of the 5G RAT (referred hereinafter as a NG-RAN). The NG-RAN sends the UE radio capability request to the UE for the radio capability information of the UE. On receiving the UE radio capability request from the NG-RAN, the UE sends its radio capability information to the NG-RAN, which then uploads the radio capability information of the UE into the AMF. The AMF sends the radio capability information of the UE to the UCMF for assigning the RAC-ID. The UCMF assigns the RAC-ID (for example: RAC-ID-1) to the received radio capability information of the UE, wherein the radio capability information may be encoded using a 5G format. The UCMF sends the RAC-ID-1 assigned to the radio capability information of the UE to the AMF and the AMF forwards the received RAC-ID-1 to the UE through the NG-RAN. The UE stores a mapping of the RAC-ID against the signaled radio capability information.

After a time period, the UE may switch OFF and switch ON in an area of a 4G RAT. In such a scenario, the UE sends the registration request including the RAC-ID-1 (which has been assigned by the UCMF for the UE, when the UE registers with the 5G RAT) to a mobility management entity (MME) of the 4G RAT. The MME sends a request including the received RAC-ID-1 of the UE to the UCMF for resolving the received RAC-ID 1 of the UE. The UCMF fetches the radio capability information of the UE corresponding to the received RAC-ID-1 and blindly sends the fetched radio capability information of the UE to a RAN (eNodeB (eNB)) of the 4G RAT, wherein the fetched radio capability information may be encoded using the 5G format. On receiving the radio capability information, the RAN node of the 4G RAT assumes that the received radio capability information may be encoded using a 4G format and incorrectly decodes the received radio capability information. The incorrect decoding of the radio capability information may occur due to the UCMF not being able to differentiate as to which format the radio capability information has to be encoded and to be returned and/or the RAN node of the 4G RAT not being able to determine the encoding format of the received radio capability information.

Consider another example scenario, wherein the UE registers in the 4G/LTE RAT. In such a scenario, the UE obtains a RAC-ID-1 corresponding to its radio capability information from the MME through the RAN node/eNB of the 4G RAT. After a time period, the UE may move toward an area of the 5G RAT and accordingly the network initiates a handover of the UE from the 4G RAT to the 5G RAT. On initiating the handover, the eNB sends a "UE transparent container" and the RAC-ID-1 of the UE to the MME. The MME sends the received "UE transparent container" and the RAC-ID-1 of the UE to the AMF, which in turn forwards the received "UE transparent container" and the RAC-ID-1 of the UE to the gNB of the 5G RAT. On receiving the UE transparent container" and the RAC-ID of the UE, the gNB checks for the radio capability information of the UE in a local database. If the gNB does not have the radio capability information of the UE in the local database, the gNB requests the AMF to resolve the RAC-ID 1 of the UE. The AMF requests the UCMF to resolve the RAC-ID 1 of the UE. The UCMF fetches the radio capability information of the UE corresponding to the received RAC-ID-1 of the UE and sends the fetched radio capability information to the AMF, wherein the fetched radio capability information may be encoded using the 4G/LTE format. The AMF sends the received radio capability information of the UE to the gNB, wherein the gNB incorrectly decodes the received radio capability information of the UE by assuming that the received radio capability information has been encoded using the 5G format.

Consider another example scenario, wherein the UE switches ON in the area of the LTE RAT and registers with the LTE RAT. In such a scenario, the UE obtains the RAC-ID 1 corresponding to its radio capability information from the MME through the RAN node/eNB of the 4G RAT. After a time period, the UE moves to an idle mode and reselects the NR/5G RAT. In such a scenario, the UE triggers a mobility registration and notifies the RAC-ID-1 to the AMF of the NR RAT. The AMF requests the UCMF to resolve the RAC-ID-1 of the UE. The UCMF fetches the radio capability information of the UE corresponding to the received RAC-ID-1 of the UE and sends the fetched radio capability information to the AMF, wherein the fetched radio capability information may be encoded in the 4G/LTE format. The AMF sends the received radio capability information of the UE to the gNB, wherein the gNB incorrectly decodes the received radio capability information of the UE by assuming that the received radio capability information has been encoded in the 5G format, which leads to further abnormalities.

Consider another example scenario, wherein a first UE (UE-A) switches ON in the LTE RAT and registers with the LTE RAT. In such a scenario, the UE-A obtains a RAC-ID-1 corresponding to its radio capability information from the MME through the RAN node/eNB of the 4G RAT. The UCMF may store the RAC-ID-1 against the radio capability information of the UE. A second UE (UE-B) with the same radio capability information of the UE-A and registers in the NR RAT. When the UE-B registers with the AMF of the NR RAT, the AMF sends the radio capability information of the UE-B (which is in the NR format) to the UCMF and requests the UCMF to assign the RAC-ID for the radio capability information of the UE-B. The UCMF assigns a new RAC-ID against the radio capability information of the UE-B, even though the capabilities of the UE-A and the UE-B are the same. Assigning different RAC-IDs for the same capabilities of the different UEs may create duplication issues. Similar duplication issues may be created while using manufacturer assigned IDs to represent the radio capability information of the UEs.

Thus, in conventional approaches, the UCMF, currently being RAT agnostic, is unable to differentiate the encoding format of the radio capability information of the UE and to check whether the encoding format of the radio capability information is usable by the RAT, which requests the radio capability information of the UE. In addition, the UCMF is unable to match existing radio capability information of the UE against the same set of radio capability information of the UE received from a different RAT (due to being encoded differently), which leads to a creation of a large database of RAC-ID vs radio capability information of the UE.

Further, in the conventional approaches, the RAN node of the target RAT is unable to perform the conversion of the radio capability information from the encoding format of the source RAT to the encoding format of the target RAT, as the RAN node of the target RAT has not been assigned with information about the encoding format of the received radio capability information of the UE.

The principal object of the embodiments herein is to disclose methods and systems for handling encoding of radio capability signalling information/radio capability information of a user equipment (UE) in a wireless network using a radio capability signalling optimization (RACS) feature.

Another object of the embodiments herein is to disclose methods and systems for encoding the radio capability information of the UE in formats of multiple radio access technologies (RATs) that have been supported by the UE and assigning a radio capability identifier (RAC-ID) to the UE for signalling the radio capability information encoded in the multiple formats across the multiple RATs.

Another object of the embodiments herein is to disclose methods and systems for encoding the radio capability information in a specific format of the indicated RAT and assigning the RAC-ID to the UE for signalling the radio capability information and the associated encoding format.

Accordingly, the embodiments herein provide methods and systems for handling radio capability signalling information of a user equipment (UE) using a radio capability signalling optimization (RACS). A method disclosed herein includes receiving, by a UE radio capability management function (UCMF), a request from a core network (CN) for assigning a radio capability identifier (RAC-ID) to the UE registered in a public land mobile network (PLMN), wherein the request for assigning the RAC-ID includes radio capability information of the UE (UE radio capability information) and a radio access technology (RAT) type. The method further includes encoding, by the UCMF, the UE radio capability information based on at least one of the RAT type indicated in the received request and at least one other RAT type supported by the PLMN. The method further includes assigning, by the UCMF, the RAC-ID to the UE that corresponds to the encoded UE radio capability information. The method further includes receiving, by the UCMF, a request from the CN for resolving the RAC-ID of the UE, wherein the request for resolving the RAC-ID includes the RAC-ID of the UE and the RAT type in combination or the RAC-ID of the UE. The method further includes resolving, by the UCMF, the RAC-ID of the UE to the UE radio capability information, based on the encoding of the UE radio capability information and the received request for resolving the RAC-ID.

Accordingly, embodiments herein provide a wireless communication system comprising a plurality of user equipments (UEs), a public land mobile network (PLMN) including a plurality of radio access technologies (RATs), wherein each RAT includes a radio access network (RAN) and a core network (CN) and a UE radio capability management function (UCMF) coupled to each RAT. The UCMF is configured to receive a request from a core network (CN) for assigning a radio capability identifier (RAC-ID) to the UE registered in a public land mobile network (PLMN), wherein the request for assigning the RAC-ID includes radio capability information of the UE (UE radio capability information) and a radio access technology (RAT) type. The UCMF is further configured to encode the UE radio capability information based on at least one of the RAT type indicated in the received request and at least one other RAT type supported by the PLMN. The UCMF is further configured to assign the RAC-ID to the UE that corresponds to the encoded UE radio capability information. The UCMF is further configured to receive a request from the CN for resolving the RAC-ID of the UE, wherein the request for resolving the RAC-ID includes the RAC-ID of the UE and the RAT type in combination or the RAC-ID of the UE. The UCMF is further configured to resolve the RAC-ID of the UE to the UE radio capability information, based on the encoding of the UE radio capability information and the received request for resolving the RAC-ID.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Embodiments herein disclose methods and systems for handling encoding of radio capability signalling information of a user equipment (UE) using radio capability signalling optimization (RACS). Referring now to the drawings, and more particularly to FIGS. 2 through 8, where similar reference characters denote corresponding features consistently throughout the figures, there are shown example embodiments.

Figure 2:
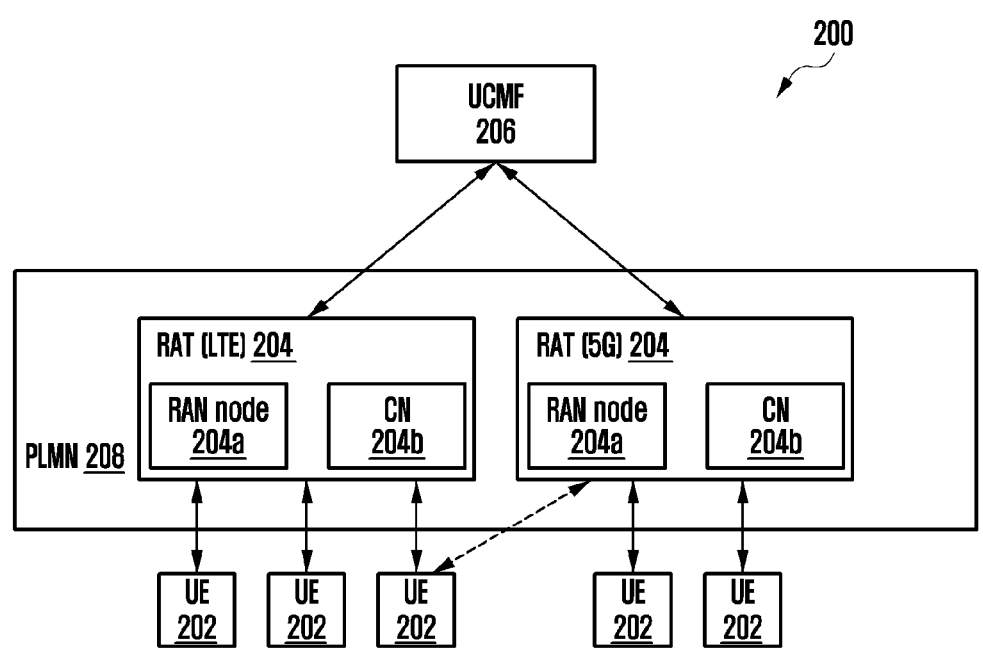
FIG. 2 depicts a wireless communication system, according to embodiments as disclosed herein.

FIG. 2 depicts a wireless communication system 200, according to embodiments as disclosed herein. The wireless communication system 200 referred herein may be configured to enable at least one user equipment (UE) to signal its radio capability information over various interfaces using radio capability signalling optimization (RACS) method/approach/feature. Examples of the interfaces may be, but is not limited to, a radio interface, a non-radio interface, and so on. The RACS method assigns a unique ID to the UE, which represents a set of radio capability information of the UE. The unique ID may be referred as a radio capability identifier (RAC-ID). Thus, the RACS optimizes the signalling of the radio capability information of the UE by improving network throughput, efficiency, and so on.

The radio capability information of the UE (hereinafter referred as UE radio capability information) includes information about radio resources supported by the UE such as, but not limited to, frequency bands, radio bearers, power class, carrier aggregation (CA) band combinations, and so on, supported by the UE. Embodiments herein use the terms such as "radio capability information of the UE", "radio capability signalling information", "UE radio capability information", "UE RACS information", "RACS information", and so on, interchangeably to refer to information that indicates radio resources supported by the UE.

The wireless communication system 200 includes a plurality of user equipments (UEs) 202, a public land mobile network (PLMN) 208 including a plurality of radio access technologies (RATs) 204, and a UE radio capability management function (UCMF) (a UCMF node) 206.

The UE(s) 202 referred herein may be a user device that is capable of supporting the one or more RATs 204 of the wireless communication system 200. Examples of the UE 202 may be, but is not limited to, a mobile phone, a smartphone, a tablet, a phablet, a personal digital assistant (PDA), a laptop, a computer, a wearable computing device, a vehicle infotainment device, an internet of things (IoT) device, a virtual reality (VR) device, a wireless fidelity (Wi-Fi) router, a universal serial bus (USB) dongle, a robot, an auto-guided vehicle, or any other device that supports the one or more RATs of the wireless communication system 200. The UE 202 may comprise of one or more processors/central processing units (CPUs), a memory, a storage, a transceiver, and so on, for performing at least one intended function/operation.

The UE 202 may be configured to register in the PLMN 208 for accessing communication services from one of the RATs 204 of the PLMN 208. Examples of the communication services may be, but not limited to, voice based services, and data based services, and so on. Examples of the data based services may be, but not limited to, surfing the Internet, chat sessions, map based services, voice over internet protocol (IP) (VoIP), and so on. The UE 202 may connect/register with one of the RATs 204 of the PLMN 208 for the communication services, by performing a registration procedure specified in 3rd generation partnership project (3GPP) specification TS 23.502. In an example, the UE 202 may register with the RAT 204 of the PLMN 208, when the UE 202 switches ON in an area/location of the corresponding RAT 204. In an example, the UE 202 may register with the RAT 204, when the UE 202 switches to the corresponding RAT 204 from another RAT by performing a handover. In an example, the UE 202 may register with the RAT 204, when the UE 202 re-selects the corresponding RAT 204. In an example, the UE 202 may register with the RAT 204, due to an idle mode mobility. The idle mode mobility involves moving of the UE 202 to a new RAT, while the UE 202 is not involved in an active communication with the serving network/RAT 204.

The UE 202 may also be configured to signal the UE radio capability information to the registered RAT 204 for accessing the communication services. The UE 202 may signal the UE radio capability information using the RACS, as defined in 3GPP specification TS 23.501.

The PLMN 208 referred herein may be a home network with which the UE 202 registers for the communication services. The PLMN 208 includes the plurality of RATs 204 for providing the communication services to the UE 202. Examples of the RAT 204 may be, but is not limited to, a 3GPP 3rd generation (3G), long term evolution (LTE/4G), LTE-Advanced (LTE-A), fifth generation (5G) new radio, a universal mobile telecommunications service (UMTS), a global system for mobile communications (GSM) enhanced data rates for GSM evolution (EDGE) radio access network (GERAN) system wireless local area network (WLAN), worldwide interoperability for microwave access (WiMAX/IEEE 802.16), Wi-Fi (IEEE 802.11), evolved-UTRA (E-UTRA), or any other next generation networks.

The RAT 204 includes a radio access network (RAN) 204a, and a core network 204b. The RAN 204a and the CN 204b may comprise of one or more processors/central processing units (CPUs), a memory, a storage, a transceiver, and so on, for performing at least one intended function/operation. In an example, the RAN 204a and the CN 204b may support the RACS method, which may be referred hereinafter as RACS supporting nodes. In another example, the RAN 204a and the CN 204b may not support the RACS method, which may be referred hereinafter as non-RACS supporting nodes.

The RAN 204a may comprise of nodes/base stations (BSs) such as, but not limited to, evolved nodes (eNBs), new radio nodes (gNBs), and so on. The RAN 204a may communicate with the UE(s) 202 and the CN 204b over the interface (the radio interface or the non-radio interface) supported by the associated RAT. The RAN 204a may be configured to connect the UE(s) 202 to the CN 204b. The RAN 204a may be configured to perform radio resource management functions such as, but not limited to, radio bearer control, radio admission control, connection mobility control, dynamic allocation of resources to the UE 202 in an uplink/downlink (scheduling), and so on.

The CN 204b may comprise one of, but is not limited to, an evolved packet core (EPC), a 5G core (5GC) network, and so on. The CN 204b may be connected to the RAN 204a and an external data network (not shown) over the interface (the radio interface or the non-radio interface) supported by the associated RAT. Examples of the external data network may be, but is not limited to, the Internet, a packet data network (PDN), an internet protocol (IP) multimedia core network subsystem, and so on. The CN 204b connects the UE(s) 202 (connected to the associated RAN 204a) to the external data network for the communication services.

The CN 204b may be configured to receive the UE radio capability information from the UE 202 through the associated RAN 204a, when the UE 202 registers with the associated RAN 204a for the communication service. The CN 204b may also be configured to send a request to the UCMF 206 for assigning the RAC-ID to the UE radio capability information. In an embodiment, the request for assigning the RAC-ID may include the UE radio capability information and a RAT type. The RAT type indicates the RAT supported by the RAN 204a associated/connected with the CN 204b. For example, consider that the RAT 204 including the CN 204b is an LTE network and the RAN 204a is an eNB. In such a scenario, the RAT type indicated by the CN 204b may be "LTE/4G RAT"

The CN 204b may also be configured to receive the RAC-ID of the UE 202 from the associated RAN 204a and send a request to the UCM 206 for resolving the received RAC-ID of the UE 202. Resolving the RAC-ID involves obtaining the UE radio capability information with respect to the corresponding RAC-ID. In an embodiment, the request for resolving the RAC-ID may include the RAC-ID of the UE 202 and the RAT type. The CN 204b may also be configured to receive the UE radio capability information corresponding to the sent RAC-ID of the UE 202 from the UCMF 206 and provide the received UE radio capability information to the associated RAN 204a.

The UCMF 206 referred herein may be anode in the wireless communication system 200, which may be configured to maintain/store UE radio capability ID mappings. The UE radio capability ID mappings provide information about the radio capability information of the UEs 202 with respect to the RAC-IDs. The UCMF 206 may also be configured to maintain/store RAC-IDs pre-configured for the UE(s) 202 by a manufacturer of the UE 202 (as defined in the 3GPP specification TS 23.501).

The UCMF 206 may also be configured to assign the RAC-ID for the UE 202, which corresponds to the UE radio capability information, on receiving the request from the CN 204b for assigning the RAC-ID for the UE 202. The request for assigning the RAC-ID includes the UE radio capability information and the RAT type. The UCMF 206 may also be configured to resolve the RAC-ID of the UE 202 to the encoded UE radio capability information, on receiving the request from the CN 204b for resolving the RAC-ID of the UE 202. The request for resolving the RAC-ID of the UE 202 includes the RAC-ID of the UE 202 and the RAT type of the RAN 204a associated with the CN 204b. Resolving the RAC-ID refers to determining the UE radio capability information for the received RAC-ID of the UE 202.

Embodiments herein enable the UCMF 206 to assign the RAC-ID for the UE 202 by storing the UE radio capability information in multiple encoding formats and to resolve the RAC-ID of the UE 202 based on the RAT type indicated in the received request for resolving the RAC-ID.

The UCMF 206 receives the request from the CN 204b for assigning the RAC-ID for the UE 202. The request for assigning the RAC-ID includes the UE radio capability information and the RAT type supported by the RAN 204*a* associated with the CN 204*b*. On receiving the request from the CN 204*b* for assigning the RAC-ID to the UE 202, the UCMF 206 encodes the UE radio capability information in all formats of the multiple RAT types/RATs that have been supported by the PLMN 208. The formats may correspond to encoding formats of the RATs supported by the PLMN 208. Embodiments herein use the terms such as "format", "encoding format", "RAT format", and so on, interchangeably to refer to an encoding rule of the RAT. The UCMF 206 maps the UE radio capability information encoded in the multiple formats with the respective RAT types. The UCMF 206 assigns the same RAC-ID for the UE radio capability information that have been encoded in all the formats of the multiple RAT types that have been supported by the PLMN 208. The UCMF 206 stores the RAC-ID assigned for the UE 202 against the UE radio capability information encoded in the multiple encoding formats and the associated RAT types in the UE radio capability ID mappings. The UCMF 206 sends the RAC-ID assigned to the UE radio capability information to the CN 204*b* in response to the received request (for assigning the RAC-ID) from the CN 204*b*. The CN 204*b* sends the received RAC-ID to the UE 202 through the associated RAN 204*a*.

The UCMF 206 also receives the request from the CN 204*b* for resolving the RAC-ID of the UE 202. The request for resolving the RAC-ID of the UE 202 includes the RAC-ID of the UE 202 and the RAT type supported by the RAN 204*a* associated with the CN 204*b*. On receiving the request from the CN 204*b* for resolving the RAC-ID, the UCMF 206 identifies the RAT type indicated in the request. On identifying the RAT type, the UCMF 206 accesses the stored UE radio capability ID mappings and fetches the UE radio capability information corresponding to the received RAC-ID and the RAT type. The UE radio capability ID mappings include the RAC-ID of the UE 202 against the UE radio capability information in all the formats of the RAT types that have been supported by the PLMN 208 and the associated RAT types. The fetched UE radio capability information corresponds to the UE radio capability information encoded in the format of the RAT type indicated in the received request for resolving the RAC-ID. The UCMF 206 sends the fetched UE radio capability information corresponding to the received RAC-ID to the CN 204*b*, in response to the received request for resolving the RAC-ID.

Embodiments herein enable the UCMF 206 to assign the RAC-ID for the UE 202 by storing the UE radio capability information in a single encoding format and to resolve the RAC-ID of the UE 202 to the UE radio capability information and the corresponding RAT type.

The UCMF 206 receives the request from the CN 204*b* for assigning the RAC-ID to the UE 202, wherein the received request for assigning the RAC-ID includes the UE radio capability information and the RAT type. On receiving the request from the CN 204*b* for assigning the RAC-ID, the UCMF 206 encodes the UE radio capability information in the encoding format of the RAT type indicated in the received request. The UCMF 206 assigns the RAC-ID for the radio capability information. The UCMF 206 maps the RAC-ID with the UE radio capability information (the encoded radio capability information) and the associated RAT type. The UCMF 206 stores the mapped RAC-ID against/with the UE radio capability information and the associated RAT type in the UE radio capability ID mappings. The UCMF 206 sends the RAC-ID assigned to the UE 202 (corresponding to the UE radio capability information) to the CN 204*b* in response to the received request (for assigning the RAC-ID) from the CN 204*b*. The CN 204*b* sends the received RAC-ID to the UE 202 through the associated RAN 204*a*.

The UCMF 206 also receives the request from the CN 204*b* for resolving the RAC-ID of the UE 202. The request for resolving the RAC-ID includes the RAC-ID of the UE 202. On receiving the request from the CN 204*b* for resolving the RAC-ID, the UCMF 206 accesses the stored UE radio capability ID mappings and fetches the UE radio capability information and the associated RAT type for the received RAC-ID. The UE radio capability ID mappings include the RAC-ID mapped against the UE radio capability information in the single format and the associated RAT type. In an embodiment, the UCMF 206 sends the fetched UE radio capability information and the associated RAT type to the CN 204*b*, in response to the request received for resolving the RAC-ID. In an embodiment, the UCMF 206 sends the RAT type in the UE radio capability information (that is the encoded information) itself, thereby eliminating a need for sending the RAT type separately to the CN 204*b*.

The CN 204*b* sends the received UE radio capability information and the associated RAT type to the associated RAN 204*a*. On receiving the UE radio capability information and the associated RAT type, the RAN 204*a* checks the encoding format of the received UE radio capability information. Based on the RAT type associated with the received UE radio capability information, the RAN 204*a* checks if the encoding format of the received UE radio capability information is same as the encoding format of the RAT 204 supported by the RAN 204*a*. If the encoding format of the received UE radio capability information is not same as the encoding format of the RAT 204 supported by the RAN 204*a* (that is the received UE radio capability information is encoded in the format of the different RAT 204), the RAN 204*a* converts the encoding format of the received UE radio capability information to the encoding format of the RAT 204 associated with the RAN 204*a*. Thus, the RAN 204*a* may perform the correct decoding of the UE radio capability information. If the encoding format of the received UE radio capability information is same as the encoding format of the RAT 204 associated with the RAN 204*a*, the RAN 204*a* decodes the UE radio capability information for further purposes.

Embodiments herein enable the UCMF 206 to assign the RAT specific RAC-IDs for the UE 202.

The UCMF 206 receives the request from the CN 204*b* for assigning the RAC-ID to the UE 202, wherein the received request for assigning the RAC-ID includes the UE radio capability information and the RAT type. On receiving the request from the CN 204*b* for assigning the RAC-ID, the UCMF 206 assigns the RAC-ID to the UE 202, which may be valid only specific to the RAT type, on which RAC-ID has been assigned to the UE 202 (i.e., specific to the RAT type indicated in the request received for assigning the RAC-ID). Upon the UE 202 switches to a new RAT 204, the UCMF 206 may assign a new RAC-ID to the UE 202 that may be valid only for the new RAT 204. In an example, the UCMF 206 may assign the new RAC-ID to the UE 202, if the UE 202 has not been assigned with any RAC-IDs for the corresponding new RAT 204. In another example, the UCMF 206 may assign the RAC-ID to the UE 202, which has been previously assigned to the UE 202 for the corresponding new RAT 204. Thus, the UE 202 and the RAN 204*a* of the RAT 204, may associate the RAT 204 on which the particular RAC-ID has been assigned to the UE 202 and may use the RAC-ID only within the same RAT.

Embodiments herein enable the UCMF 206 to assign the RAC-ID for the UE 202 by storing the UE radio capability information in a common encoding format and to resolve the RAC-ID of the UE 202 based on the UE radio capability information stored in the common encoding format.

The UCMF 206 receives the request from the CN 204b for assigning the RAC-ID to the UE 202, wherein the received request for assigning the RAC-ID includes the UE radio capability information and the RAT type. On receiving the request from the CN 204b for assigning the RAC-ID, the UCMF 206 encodes the UE radio capability information in the common encoding format (for example: common "RACS-Format"). The UCMF 206 assigns the RAC-ID to the UE 202, corresponding to the UE radio capability information encoded in the common encoding format. In such a scenario, on receiving the request from the CN 204b for resolving the RAC-ID of the UE 102, the UCMF 206 resolves the received RAC-ID by identifying the common encoding format (for example: "RACS format") in which the UE radio access capability information corresponding to the received RAC-ID has been stored. The UCMF 206 provides the identified common encoding format including the UE radio capability information to the requested CN 204b. Further, the CN 204b, and the RAN 204a may be configured to receive and/or transfer the UE radio capability information between each other in the common encoding format.

Embodiments herein enable an exchange of the UE radio capability information between the RACS supporting nodes and the non-RACS supporting nodes.

The CN 204b of the RAT 204, configured to support the RACS method (i.e., the RACS supporting node) and encoding of the UE radio capability information in the common encoding format receives the UE radio capability information from the CN of another RAT, which does not support the RACS method (i.e., the non-RACS supporting node). The CN 204b/RACS supporting node 204b may receive the UE radio capability information from the non-RACS supporting node as a part of a handover/context transfer, when the UE 202 is switched to the RAT 204 from another RAT (which includes the non-RACS supporting node). In such a scenario, the CN 204b determines if the associated RAN 204a is able to decode the received UE radio capability information, since the UE 202 is accessing the CN 204b via the CN of another RAT, which does not support the RACS. On determining that the associated RAN 204a is not able to decode the received UE radio capability information, the CN 204b discards the received UE radio capability information and fetches the UE radio capability information afresh from the respective UE 202.

Embodiments herein enable the UCMF 206 to assign the RAC-IDs to the UE 202, wherein the RAC-IDs may be the RAC-IDs assigned by the manufacturer of the UE 202 and to resolve the RAC-ID, on receiving the request from the CN 204b for resolving the RAC-ID. The UCMF 206 resolves the RAC-ID by fetching the UE radio capability information corresponding to the RAC-ID and the RAT type specified in the received request. The UCMF 206 provides the fetched UE radio capability information to the CN 204b.

FIG. 2 show exemplary blocks of the wireless communication system 200, but it is to be understood that other embodiments are not limited thereon. In other embodiments, the wireless communication system 200 may include less or more number of blocks. Further, the labels or names of the blocks are used only for illustrative purpose and does not limit the scope of the embodiments herein. One or more blocks can be combined together to perform same or substantially similar function in the wireless communication system 200.

Figure 3:
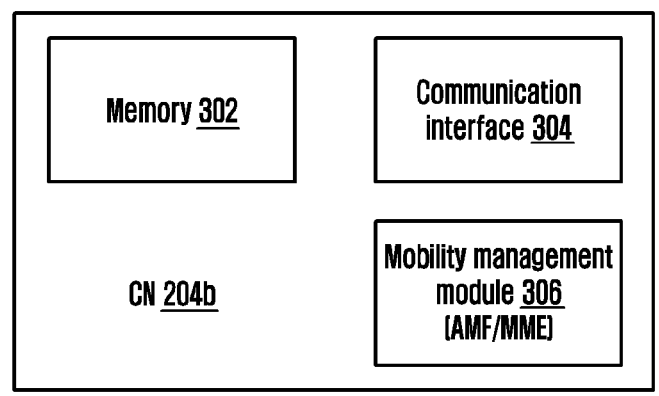
FIG. 3 is a block diagram depicting various components of a core network (CN) of a radio access technology (RAT), according to embodiments as disclosed herein.

FIG. 3 is a block diagram depicting various components of the CN 204b of the RAT 204, according to embodiments as disclosed herein. The CN 204b may include at least one of, but is not limited to, an EPC, a 5GC network, and so on. The CN 204b includes a memory 302, a communication interface 304, and a mobility management module 306. The CN 204a may also include other management modules/functional elements (not shown).

The memory 302 may store information related to at least one of, but not limited to, the UEs 202, the associated RANs 204a, the encoding format of the associated RAT 204, and so on.

The communication interface 304 may be configured to enable the CN 204b of the RAT 204 to communicate with at least one of, the UE(s) 202, the RANs 204a, the CNs 204b of the other RATs 204, and so on, over the interface supported by the corresponding RAT 204. Examples of the interface may be at least one of a wired or wireless fronthaul interface, a wired/non-radio or wireless/radio interface, or any structure supporting communications over a wired or wireless connection.

The mobility management module 306 may be a core functional element/module that depends on the RAT type/RAT 204. In an example, consider that the RAT 204 including the CN 204b is an LTE/4G network. In such a scenario, the CN 204b of the LTE RAT may be an EPC and the mobility management module 306 of the EPC 204b may be a mobility management entity (MME) 306. In another example, consider that the RAT 204 including the CN 204b is a NR/5G RAT. In such a scenario, the CN 204b may be a 5GC network and the mobility management module 306 of the 5GC network may be an access and mobility management function (AMF) 306. The mobility management module 306 may be configured to receive a registration request of the UE 202 for the communication service. In an example, the mobility management module 306 may receive the registration request, when the UE 202 switches ON in the area/location of the RAT 204 supported by the CN 204b. In another example, the mobility management module 306 may receive the registration request, when the UE 202 switches to the associated CN 204b from the other RAT. In another example, the mobility management module 306 may receive the registration request, when the UE 202 re-selects the RAT 204 associated with the CN 204b. In another example, the mobility management module 306 may receive the registration request, due to the idle mode mobility of the UE 202. The received registration request may include the RAC-ID. Alternatively, the received request may not include the RAC-ID.

On receiving the registration request without the RAC-ID, the mobility management module 306 sends a request to the UE 202 through the associated RAN 204a for the UE radio capability information and receives the UE radio capability information from the UE 202 through the RAN 204a. The mobility management module 306 sends the request including the UE radio capability information and the RAT type to the UCMF 206 and requests the UCMF for assigning the RAC-ID to the UE 202. The RAT type may be the RAT supported by the RAN 204a associated with the CN 204b. The mobility management module 306 of the CN 204b may determine an access type and the RAT type based on the 3GPP specifications. In example, the mobility management module 306 of the CN 204b may determine the RAT type based on a global RAN node ID associated with an N2 interface. In an example, if the CN 204b is the EPC, then the RAT type may be a "4G RAT". In another example, if the CN 204b is the 5GC network, then the RAT type may be a "NR/5G RAT". The mobility management module 306 receives the RAC-ID for the UE 202 from the UCMF 206, in response to the sent request (for assigning the RAC-ID) to the UCMF 206. The mobility management module 306 sends the RAC-ID to the UE 202 through the associated RAN 204a.

On receiving the registration request including the RAC-ID, the mobility management module 306 sends the request to the UCMF 206 for resolving the received RAC-ID. The request includes the RAC-ID and the RAT type. The mobility management module 306 receives the UE radio capability information corresponding to the sent RAC-ID from the UCMF 206. In an example, the UE radio capability information may include the encoded UE radio capability information in the format of the RAT supported by the CN 204b/RAN 204a. In another example, the UE radio capability information may include the encoded UE radio capability information and the RAT type. The mobility management module 306 forwards the UE radio capability information to the associated RAN 204a for a further purpose.

The mobility management module 306 may also be able to determine if the associated RAN 204a is able to decode the received UE radio capability information, if the UE radio capability information has been received from the non-RACS supporting node. If the associated RAN 204a does not able to decode the received UE radio capability information, the mobility management module 306 discards the received UE radio capability information and requests the UCMF 206 for the UE radio capability information that may be in the format of the RAT type supported by the RAN 204a associated with the CN 204b. In an example, consider that the CN 204b is the EPC and the mobility management module/MME 306 of the CN 204b receives the UE radio capability information encoded in the format of the "NR/5G RAT". In such a scenario, the mobility management module 306 discards the received UE radio capability information, upon determining that the associated RAN 204a may not be able to decode the received UE radio capability information. The mobility management module/MME 306 requests the UCMF 206 for the UE radio capability information encoded in the format of the "4G RAT"

FIG. 3 show exemplary blocks of the CN 204b, but it is to be understood that other embodiments are not limited thereon. In other embodiments, the CN 204b may include less or more number of blocks. Further, the labels or names of the blocks are used only for illustrative purpose and does not limit the scope of the embodiments herein. One or more blocks can be combined together to perform same or substantially similar function in the CN 204b.

Figure 4:
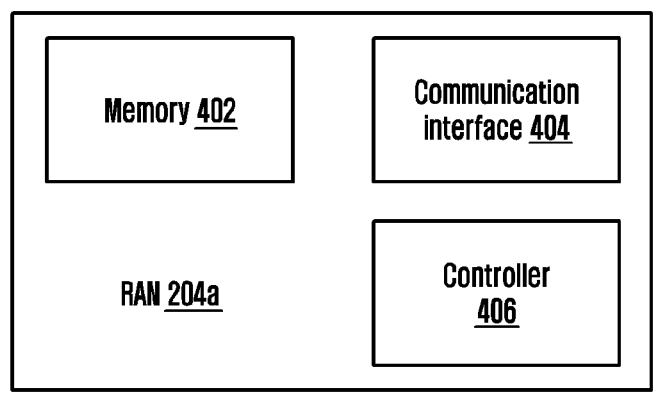
FIG. 4 is a block diagram depicting various components of a radio access network (RAN), according to embodiments as disclosed herein.

FIG. 4 is a block diagram depicting various components of the RAN 204a, according to embodiments as disclosed herein. The RAN 204a includes a memory 402, a communication interface 404, and a controller 406. The RAN 204a also includes antennas, transceivers, a processing circuitry, and so on (not shown).

The memory 402 may store information related to at least one of, but not limited to, the UEs 202, the associated CN 204b, the encoding format of the RAT 204 supported by the RAN 204a, and so on.

The communication interface 404 may be configured to enable the RAN 204a of the RAT 204 to communicate with at least one of, the UE(s) 202, the CNs 204b of the same RAT 204, and so on, over the interface supported by the corresponding RAT 204.

The controller 406 may be at least one of a single processer, a plurality of processors, multiple homogeneous or heterogeneous cores, multiple central processing units (CPUs) of different kinds, microcontrollers, special media, and so on.

The controller 406 may be configured to receive and decode the UE radio capability information of the UE 202 for enabling the UE 202 to access the communication service.

The controller 406 receives the UE radio capability information of the UE 202 from the associated CN 204b. In an example, the UE radio capability information may include the encoded UE radio capability information in the format of the RAT supported by the RAN 204a. In another example, the UE radio capability information may include the encoded UE radio capability information and the RAT type. In an example, the RAT type may be included in the encoded UE radio capability information. In another example, the RAT type may be indicated separately. In an embodiment, on receiving the encoded UE radio capability information in the format of the RAT supported by the RAN 204a, the controller 406 decodes the received UE radio capability information using a decoding format of the RAT type supported by the RAN 204a.

In an embodiment, on receiving the encoded UE radio capability information and the associated RAT type, the controller 406 uses the received RAT type and checks if the received UE radio capability information has been encoded in the format of the RAT type supported by the RAN 204a. If the received UE radio capability information has been encoded in the format of the RAT type supported by the RAN 204a, the controller 206 decodes the received UE radio capability information using the decoding format of the RAT type supported by the RAN 204a. For example, consider that the RAN 204a includes an eNB of an LTE/4G RAT and the controller 406 of the RAN 204a receives the UE radio capability information from the CN/EPC 204b. The received UE radio capability information includes the encoded UE radio capability information and the associated RAT type. In an example herein, consider that the RAT type may be "4G RAT". In such a scenario, the controller 406 of the RAN/eNB 204a determines that the received UE radio capability information is in the same encoding format supported by the LTE/4G RAT and decodes the UE radio capability information using the decoding format of the LTE/4G RAT.

If the received UE radio capability information has not been encoded in the format of the RAT type supported by the RAN 204a, the controller 406 converts the received UE radio capability information into the format of the RAT type supported by the RAN 204a. The controller 406 then decodes the converted UE radio capability information using the decoding format of the RAT type supported by the RAN 204a. For example, consider that the RAN 204a includes an gNB of a NR/5G RAT and the controller 406 of the RAN 204a receives the UE radio capability information from the CN/5GC network 204b. The UE radio capability information includes the encoded UE radio capability information and the associated RAT type. In an example herein, consider that the RAT type may be "4G RAT". In such a scenario, the controller 406 of the RAN/gNB 204a determines that the received UE radio capability information is in the different encoding format (i.e., the received UE radio capability information is in the encoding format supported by the LTE/4G network). Thereafter, the controller 406 converts the received UE radio capability information into the format supported by the NR/5G RAT and decodes the converted UE radio capability information.

The controller 406 may also be configured to receive the request of the non-supporting RACS node (i.e., the CN of the RAT that does not support the RACS) through the associated CN 204b for the UE radio capability information of the UE 202. In such a scenario, the controller 406 sends the UE radio capability information to the CN 204b, instead of the RAC-ID of the UE 202. The CN 204b forwards the UE radio capability information to the non-supporting RACS node. Alternatively, on receiving the request of the non-supporting RACS node for the UE radio capability information, the controller 406 converts the UE radio capability information into the format supported by the format of the non-supporting RACS node according to capabilities of the non-supporting RACS node. The controller 406 sends the converted UE radio capability information to the associated CN 204b. The CN 204b forwards the received UE radio capability information to the non-supporting RACS node.

FIG. 4 show exemplary blocks of the RAN 204a, but it is to be understood that other embodiments are not limited thereon. In other embodiments, the RAN 204a may include less or more number of blocks. Further, the labels or names of the blocks are used only for illustrative purpose and does not limit the scope of the embodiments herein. One or more blocks can be combined together to perform same or substantially similar function in the RAN 204a.

Figure 5:
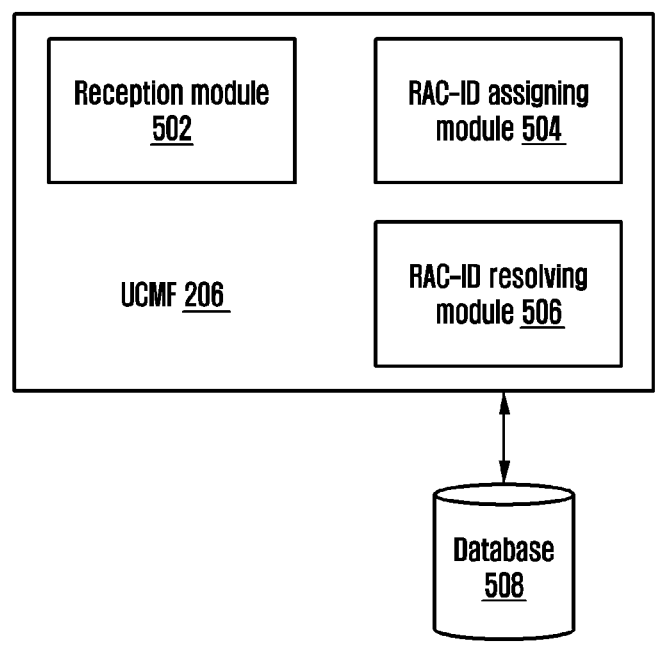
FIG. 5 is a block diagram depicting various components of a UE radio capability management function (UCMF) for assigning and resolving radio capability identifier (RAC-ID), according to embodiments as disclosed herein.

FIG. 5 is a block diagram depicting various components of the UCMF 206 for assigning and resolving RAC-TD(s), according to embodiments as disclosed herein.

The UCMF 206 includes a reception module 502, a RAC-ID assigning module 504, and a RAC-ID resolving module 506. The UCMF 206 may also be coupled with a database 508. The UCMF 206 stores the unique IDs configured for the UE 202 by at least one of, but is not limited to, the manufacturer of the UE 202, or the like in the database 508. The unique IDs assigned to the UE 202 may represent the UE radio capability information. The UCMF 206 may also store the UE radio capability ID mappings in the database 508.

The reception module 502 may be configured to receive the request from the CN 204b of the RAT 204 for assigning the RAC-ID to the UE 202. The request for assigning the RAC-ID may include the UE radio capability information and the RAT type. The reception module 502 sends the request for assigning the RAC-ID to the RAC-ID assigning module 504.

The reception module 502 may also be configured to receive the request from the CN 204b of the RAT 204 for resolving the RAC-ID to the UE 202. The request for resolving the RAC-ID may include the RAC-ID of the UE 202 and the RAT type. Alternatively, the request for resolving the RAC-ID may include only the RAC-ID of the UE 202. The reception module 502 sends the request for resolving the RAC-ID to the RAC-ID resolving module 506.

The RAC-ID assigning module 504 may be configured to assign the RAC-ID for the UE 202, on receiving the request for assigning the RAC-ID. The request includes the UE radio capability information and the RAT type. On receiving the request for assigning the RAC-ID, the RAC-ID assigning module 504 encodes the received UE radio capability information.

In an embodiment, the RAC-ID assigning module 504 encodes the UE radio capability information in the multiple formats of the multiple RATs that have been supported by the PLMN 208.

In another embodiment, the RAC-ID assigning module 504 encodes the received UE radio capability information in the common encoding format (for example: the common "RACS-Format").

In an example herein, the UE radio capability information encoded in the common encoding format is as depicted below:

{0,(aaaa)}  {1,(bbbb)}  {2,(cccc)}  {3,(dddd)}  {4,(eeee)} . . .

wherein, 0, 1, 2, 3, 4 . . . may correspond to the RAT type according to an enumeration provided below:

RAT type=ENUMERATED {eutra(0), utra, geran-cs, geran-ps, cdma2000-1×RTT, nr(5), eutra-nr, spare1, . . . } wherein, aaaa, bbbb, cccc, dddd, eeee . . . may represent the UE radio capability information corresponding to their RAT types (that have been supported by the PLMN 208).

Encoding the UE radio capability information in the common encoding format solves an encoding mismatch issue and enable the UCMF 206 and other participating RACS supporting nodes agnostic to per RAT-type encoding of the UE radio capability information.

In another embodiment, the RAC-ID assigning module 504 encodes the UE radio capability information in the specific format of the RAT type indicated in the request received for assigning the RAC-ID to the UE 202.

On encoding the UE radio capability information, the RAC-ID assigning module 504 maps the encoded UE radio capability information and the associated RAT type. The RAC-ID assigning module 504 assigns the RAC-ID to the UE radio capability information encoded in the format of the RAT type indicated in the received request. In an example, the RAC-ID assigning module 504 assigns the RAC-ID, irrespective of the RAT types. In another example, the RAC-ID assigning module 504 assigns the unique RAC-ID for each RAT type. Therefore, the RAC-ID assigned for one RAT type may not be used for another RAT type. The RAC-ID assigning module 504 maps the RAC-ID with the UE radio capability information encoded in the particular format and the associated RAT type. The RAC-ID assigning module 504 stores the mapping of the RAC-ID with the UE radio capability information encoded in the particular format and the associated RAT type in the UE radio capability ID mappings.

The RAC-ID resolving module 506 may be configured to resolve the RAC-ID of the UE 202, on receiving the request for resolving the RAC-ID of the UE 202. The request includes the RAC-ID of the UE 202 and the RAT type. Resolving the RAC-ID involves fetching the UE radio capability information corresponding to the RAC-ID in the received request from the stored UE radio capability ID mappings.

In an embodiment, for resolving the RAC-ID, the RAC-ID resolving module 506 identifies the RAT type indicated in the received request for resolving the RAC-ID. The RAC-ID resolving module 506 accesses the stored UE radio capability ID mappings from the database 508 and compares the received RAC-ID with the RAC-IDs stored in the UE radio capability ID mappings. The UE radio capability ID mappings includes the mapping of the RAC-ID with the UE radio capability information encoded in the multiple formats and the associated RAT types. The RAC-ID resolving module 506 retrieves the stored UE radio capability information encoded in all the formats and the associated RAT types from the UE radio capability ID mappings, which corresponds to the RAC-ID that is matched with the received RAC-ID. The RAC-ID resolving module 506 fetches the UE radio capability information corresponding to the received RAT type from the retrieved UE radio capability information and the associated RAT types. The RAC-ID resolving module 506 sends the fetched UE radio capability information to the requested CN 204b.

For example, consider that RAC-ID resolving module 506 receives the request of the CN 204b for resolving the RAC-ID of the UE 202, wherein the request includes the RAC-ID and the RAT type (for example: the RAT type may be "NR/5G RAT"). In such a scenario, the RAC-ID resolving module 506 retrieves the UE radio capability information and the associated RAT types for the received RAC-ID from the UE radio capability ID mappings stored in the database 508. The RAC-ID resolving module 506 fetches the UE radio capability information from the retrieved UE radio capability information and the associated RAT types, that is associated with the "NR/5G RAT" The fetched UE radio capability information has been encoded in the format of the NR/5G RAT. The RAC-ID resolving module 506 sends the fetched UE radio capability information to the requested CN 204b.

In an embodiment, for resolving the RAC-ID, the RAC-ID resolving module 506 identifies the RAT type indicated in the received request for resolving the RAC-ID. The RAC-ID resolving module 506 accesses the stored UE radio capability ID mappings from the database 508 and compares the received RAC-ID with the RAC-IDs stored in the UE radio capability ID mappings. The UE radio capability ID mapping include mapping of the RAC-ID with the UE radio capability information encoded in the single format and the associated RAT type. The RAC-ID resolving module 506 retrieves the stored UE radio capability information and the associated RAT type from the UE radio capability ID mappings, which corresponds to the RAC-ID that is matched with the received RAC-ID. The RAC-ID resolving module 506 sends the fetched UE radio capability information and the RAT type to the requested CN 204b.

FIG. 5 show exemplary blocks of the UCMF 206, but it is to be understood that other embodiments are not limited thereon. In other embodiments, the UCMF 206 may include less or more number of blocks. Further, the labels or names of the blocks are used only for illustrative purpose and does not limit the scope of the embodiments herein. One or more blocks can be combined together to perform same or substantially similar function in the UCMF 206.

Figure 6:
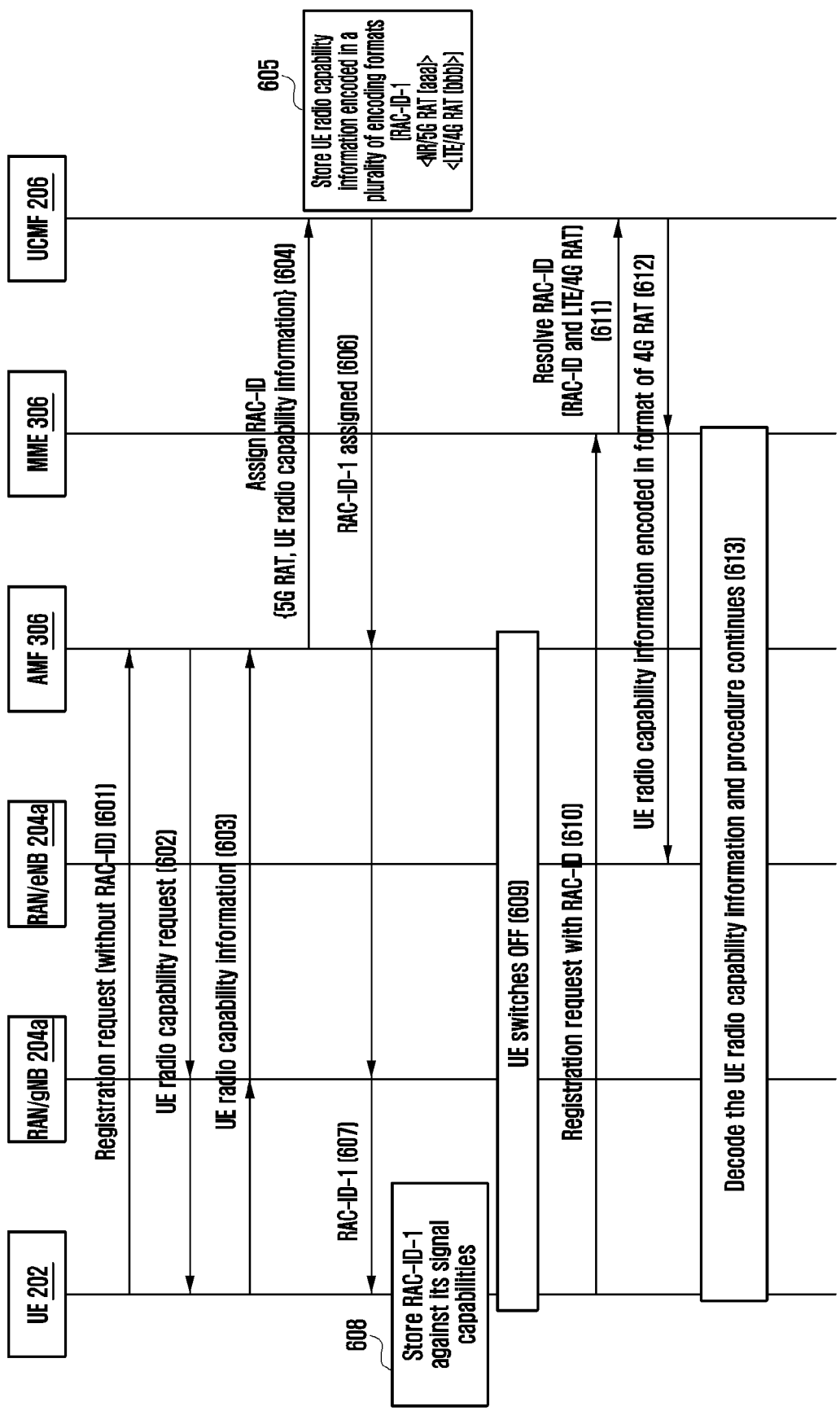
FIG. 6 is an example sequence diagram depicting encoding of UE radio capability information for signalling over various interfaces of the RATs, according to embodiments as disclosed herein.

FIG. 6 is an example sequence diagram depicting encoding of the UE radio capability information for signalling over the various interfaces of the RATs, according to embodiments as disclosed herein.

Embodiments herein further explain the encoding of the UE radio capability information by considering switching of the UE from a NR/5G RAT to an LTE/4G RAT, but it may be obvious to a person skilled in the art that switching of the UE between any other RATs may be considered. Consider an example scenario, as depicted in FIG. 6, wherein the UE 202 switches ON in the area of the NR/5G RAT 204. In such a scenario, at step 601, the UE 202 sends the registration request (without the RAC-ID) to the mobility management module/AMF 306 of the CN/5GC network in the NR/5G RAT 204 for accessing the communication service. As a part of a registration procedure, at step 602, the RAN/gNB 204a of the NR/5G RAT 204 sends the UE radio capability request to the UE 202, when the RAN/gNB 204a does not receive the UE capability information from the AMF 306 in response to the registration request of the UE 202. On receiving the UE radio capability request, at step 603, the UE 202 sends the UE radio capability information to the gNB 204a, which uploads the UE radio capability information into the AMF 306. At step 604, the AMF 306 sends the request to the UCMF 206 for assigning the RAC-ID to the UE 202. The request includes the UE radio capability information and the RAT type (i.e., "NR/5G RAT" in an example herein).

At step 605, the UCMF 206 encodes the received UE radio capability information in the multiple formats of the RAT types that have been supported by the PLMN 208. The UCMF 206 maps the UE radio capability information in the multiple formats with the associated RAT types. In an example herein, the UCMF 206 encodes the received UE radio capability information in the format supported by the NR/5G RAT (for example: aaa) and the format supported by the LTE/4G RAT (for example: bbb). The UCMF 206 maps the UE radio capability information aaa encoded in the format of the NR/5G RAT with the RAT type as "NR/5G RAT" (i.e., <NR/5G (aaa)). The UCMF 206 also maps the UE radio capability information bbb encoded in the format of the LTE/4G RAT with the RAT type as "LTE/4G RAT" (i.e., <LTE/4G (bbb)). The UCMF 206 assigns the RAC-ID (for example: a RAC-ID 1) to the UE 202, which corresponds to the set of UE radio capability information encoded in the multiple formats of the RAT types that have been supported by the UE 202. The UCMF 206 stores the mapping of the RAC-ID-1 with the UE radio capability information encoded in the multiple formats and the associated RAT types in the UE radio capability ID mappings. For example, the mapping may include the RAC-ID-1 associated with the UE radio capability information (<NR/5G (aaa), LTE/4G (bbb)>). At step 606, the UCMF 206 sends the RAC-ID-1 assigned to the UE 202 to the requested AMF 306. At step 607, the AMF 306 sends the received RAC-ID-1 from the UCMF 206 to the UE 202 through the gNB 204a. At step 608, the UE 202 stores the received RAC-ID-1 against its signalled capabilities.

At step 609, the UE 202 switches OFF and switches ON in the area/location of the LTE/4G RAT 204. Thereafter, at step 610, the UE 202 sends the registration request to the mobility management module/MME 306 of the CN/EPC 204b in the LTE/4G RAT. The registration request includes the RAC-ID-1 of the UE 202, which corresponds to the UE radio capability information. At step 611, the MME 306 sends the request to the UCMF 206 for resolving the RAC-ID-1. The request for resolving the RAC-ID-1 includes the RAC-ID-1 of the UE 202 and the RAT type (i.e., "LTE/4G RAT" in an example herein). At step 612, the UCMF 206 fetches the UE radio capability information encoded in the format of the LTE/RAT and corresponding to the received RAC-ID-1 from the stored UE radio capability ID mappings. In an example herein, the UCMF 206 fetches the UE radio capability information bbb. The UCMF 206 sends the fetched UE radio capability information (that has been encoded in the format of the LTE/4G RAT) to the requested MME 306, which in turn forwards the received UE radio capability information to the RAN/eNB 204a of the LTE/4G RAT 204. At step 613, the eNB 204a decodes the received UE radio capability information to determine the radio capabilities of the UE 202.

FIG. 7 is another example sequence diagram depicting encoding of the UE radio capability information for signalling over the various interfaces, according to embodiments as disclosed herein.

Embodiments herein further explain the encoding of the UE radio capability information by considering switching of the UE from a NR/5G RAT to an LTE/4G RAT, but it may be obvious to a person skilled in the art that switching of the UE between any other RATs may be considered. Consider an example scenario, as depicted in FIG. 7, wherein the UE 202 switches ON in the area of the NR/5G RAT 204. In such a scenario, at step 701, the UE 202 sends the registration request (without the RAC-ID) to the mobility management module/AMF 306 of the CN/5GC network in the NR/5G RAT 204 for accessing the communication service. As a part of the registration procedure, at step 702, the RAN/gNB 204*a* of the NR/5G RAT 204 sends the UE radio capability request to the UE 202, when the RAN/gNB 204*a* does not receive the UE capability information from the AMF 306 in response to the registration request of the UE 202. On receiving the UE radio capability request, at step 703, the UE 202 sends the UE radio capability information to the gNB 204*a*, which in-turn uploads the UE radio capability information into the AMF 306. At step 704, the AMF 306 sends the request to the UCMF 206 for assigning the RAC-ID to the UE 202. The request includes the UE radio capability information and the RAT type (i.e., "NR/5G RAT" in an example herein).

At step 705, the UCMF 206 encodes the received UE radio capability information in the single format of the RAT type (i.e., the "NG/5G RAT") indicated in the received request. For example, the encoded UE radio capability information may be "aaa" The UCMF 206 assigns the RAC-ID (for example; a RAC-ID-1) for the UE radio capability information encoded in the format of the RAT type indicated in the received request. The UCMF 206 stores the mapping of the RAC-ID-1 with the UE radio capability information and the associated RAT type in the UE radio capability ID mappings. For example, the mapping may include the RAC-ID-1 associated with the UE radio capability information (<NR/5G (aaa)). At step 706, the UCMF 206 sends the RAC-ID-1 assigned to the UE 202 to the requested AMF 306. At step 707, the AMF 306 sends the received RAC-ID-1 from the UCMF 206 to the UE 202 through the gNB 204*a*. At step 708, the UE 202 stores the received RAC-ID-1 against its signalled capabilities.

At step 709, the UE 202 switches OFF and switches ON in the area/location of the LTE/4G RAT 204. Thereafter, at step 710, the UE 202 sends the registration request to the mobility management module/MME 306 of the CN/EPC 204*b* in the LTE/4G RAT. The registration request includes the RAC-ID-1 of the UE 202, which corresponds to the UE radio capability information. At step 711, the MME 306 sends the request to the UCMF 206 for resolving the RAC-ID-1. The request for resolving the RAC-ID-1 includes the RAC-ID-1 of the UE 202. At step 712, the UCMF 206 fetches the UE radio capability information and the corresponding RAT type for the received RAC-ID 1 from the stored UE radio capability ID mappings. In an example herein, the fetched UE radio capability information may be "<NR/5G (aaa)>". At step 713, the UCMF 206 sends the fetched UE radio capability information to the requested MME 306, which in turn forwards the received UE radio capability information to the RAN/eNB 204*a* of the LTE/4G RAT 204.

On receiving the UE radio capability information including the RAT type, at step 714, the eNB 204*a* determines that the received UE radio capability information in the 5G/NR RAT and converts/transcodes the received UE radio capability information into the format of the LTE/4G RAT.

Figure 8A:
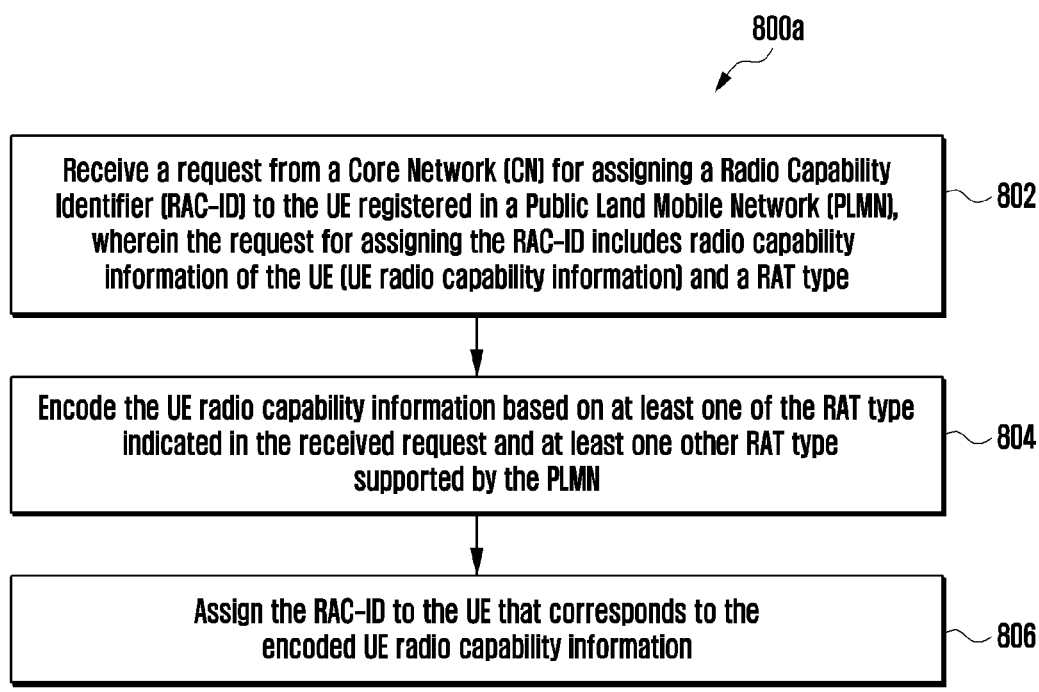
FIG. 8a is a flow diagram depicting a method for handling encoding of the UE radio capability information using the RACS, according to embodiments as disclosed herein.

FIG. 8*a* is a flow diagram 800*a* depicting a method for handling encoding of the UE radio capability information using the RACS, according to embodiments as disclosed herein.

At step 802, the method includes receiving, by the UCMF 206, the request from the CN 204*b* for assigning the RAC-ID to the UE 202 registered in the PLMN 208. The request for assigning the RAC-ID to the UE 202 includes the UE radio capability information and the RAT type. The RAT type indicates the RAT supported by the RAN 204*a* connected with the CN 204*b*.

At step 804, the method includes encoding, by the UCMF 206, the UE radio capability information based on at least one of the RAT type indicated in the received request and at least one other RAT type supported by the PLMN 208. In an embodiment, the UCMF 206 encodes the UE radio capability information in the plurality of encoding formats, which include the encoding format of the RAT type indicated in the received request and the at least one encoding format of the at least one other RAT type supported by the PLMN 208. In another embodiment, the UCMF 206 encodes the UE radio capability information in the encoding format of the RAT type indicated in the received request. In another embodiment, the UCMF 206 encodes the UE radio capability information in the common RACS format. The common RACS format includes the UE radio capability information encoded in the encoding formats of the RATs that have been supported by the PLMN 208 and a provision indicating the RAT type corresponding to each encoded UE radio capability information.

At step 806, the method includes assigning, by the UCMF 206, the RAC-ID to the UE 202 that corresponds to the encoded UE radio capability information. The UCMF 206 performs the mapping of the RAC-ID against the encoded UE radio capability information and the corresponding RAT type and stores the mapping in the UE radio capability ID mappings. The encoded UE radio capability information may be the UE radio capability information encoded in the plurality of encoding formats or the UE radio capability information encoded in the encoding format of the RAT type indicated in the received request. Alternatively, the UCMF 206 performs mapping of the RAC-ID against the common RACS format and stores the mapping in the UE radio capability ID mappings. The various actions in method 800*a* may be performed in the order presented, in a different order or simultaneously. Further, in some embodiments, some actions listed in FIG. 8*a* may be omitted.

Figure 8B:
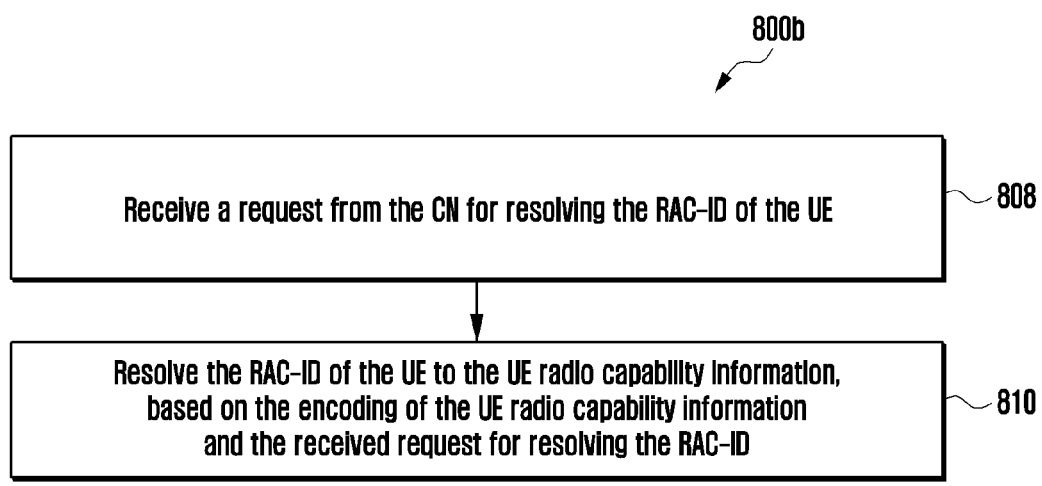
FIG. 8b is a flow diagram depicting a method for resolving the RAC-ID of the UE to the UE radio capability information, according to embodiments as disclosed herein.

FIG. 8*b* is a flow diagram 800*b* depicting a method for resolving the RAC-ID of the UE 202 to the UE radio capability information, according to embodiments as disclosed herein.

At step 808, the method includes receiving, by the UCMF 206, the request from the CN 204*b* for resolving the RAC-ID of the UE 202. The request for resolving the RAC-ID includes the RAC-ID of the UE 202 and the RAT type. Alternatively, the request for resolving the RAC-ID includes the RAC-ID of the UE 202.

At step 810, the method includes resolving, by the UCMF 206, the RAC-ID of the UE 202, based on the encoding of the UE radio capability information and the received request for resolving the RAC-ID. In an embodiment, if the UE radio capability information is encoded in the plurality of encoding formats and the received request includes the RAT type and the RAC-ID, the UCMF 206 determines the encoded UE radio capability information for the received RAC-ID and the RAT type from the UE radio capability ID mappings. The UCMF 206 sends the determined encoded UE radio capability information to the CN 204*b*, which in turn forwards the encoded UE radio capability information to the RAN 204*a* for decoding.

In another embodiment, if the UE radio capability information is encoded in the single encoding format and the received request includes the RAC-ID, the UCMF 206 determines the encoded UE radio capability information for the received RAC-ID and the corresponding RAT type from the UE radio capability ID mappings. The UCMF 206 sends the determined encoded UE radio capability information and the corresponding RAT type to the CN 204*b*, which in turn forwards the encoded UE radio capability information and the corresponding RAT type to the RAN 204*a* for decoding.

In another embodiment, if the UE radio capability information is encoded in the common RACS format and the received request includes the RAC-ID, the UCMF 206 determines the common RACS format for the received RAC-ID from the UE radio capability ID mappings. The UCMF 206 sends the determined common RACS format to the CN 204*b*, which in turn forwards the received common RACS format to the RAN 204*a* for decoding.

The various actions in method 800*b* may be performed in the order presented, in a different order or simultaneously. Further, in some embodiments, some actions listed in FIG. 8*b* may be omitted.

The embodiments disclosed herein can be implemented through at least one software program running on at least one hardware device and performing network management functions to control the elements. The elements shown in FIGS. 2, 3, 4, and 5, can be at least one of a hardware device, or a combination of hardware device and software module.

The embodiments disclosed herein describe methods and systems for handling radio capability signalling information of UE using radio capability signalling optimization (RACS). Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. very high speed integrated circuit hardware description language (VHDL) another programming language or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

The invention claimed in:

1. A method performed by a user equipment radio capability management function (UCMF) in a wireless communication system, the method comprising:
receiving, from a first network function (NF) associated with mobility management, a first request message for assigning a user equipment (UE) radio capability identity (ID), wherein the first request message includes UE radio capability information encoded in an encoding format associated with a radio access technology (RAT) type and information on the RAT type associated with the encoding format of the UE radio capability information;
assigning the UE radio capability ID associated with the RAT type to the UE radio capability information encoded in the encoding format; and
transmitting, to the first NF, the UE radio capability ID.

2. The method of claim 1, further comprising:
receiving, from a second NF, a second request message for resolving a second UE radio capability ID, wherein the second request message includes the second UE radio capability ID and a second RAT type;
identifying second UE radio capability information corresponding to the second UE radio capability ID and the second RAT type, from mapping information between at least one UE radio capability information and corresponding UE radio capability ID; and
transmitting, to the second NF, the second UE radio capability information encoded in an encoding format associated with the second RAT type.

3. The method of claim 1,
wherein the UE radio capability ID is assigned by a manufacturer or a public land mobile network (PLMN), and
wherein the encoding format of the UE radio capability information is one of a fifth generation system (5GS) format or an evolved packet system (EPS) format.

4. The method of claim 1, further comprising:
storing a mapping between the UE radio capability ID and corresponding UE radio capability information.

5. A method performed by a network function (NF) associated with mobility management in a wireless communication system, the method comprising:
transmitting, to a user equipment radio capability management function (UCMF), a first request message for assigning a user equipment (UE) radio capability identity (ID), wherein the first request message includes UE radio capability information encoded in an encoding format associated with a radio access technology (RAT) type and information on the RAT type associated with the encoding format of the UE radio capability information; and
receiving, from the UCMF, the UE radio capability ID assigned to the UE radio capability information encoded in the encoding format,
wherein the UE radio capability ID is associated with the RAT type.

6. The method of claim 5, further comprising:
transmitting, to the UCMF, a second request message for resolving a second UE radio capability ID, wherein the second request message includes the second UE radio capability ID and a second RAT type; and receiving, from the UCMF, second UE radio capability information corresponding to the second UE radio capability ID, wherein the second UE radio capability information is obtained based on the second UE radio capability ID and the second RAT type from mapping information between at least one UE radio capability information and corresponding UE radio capability ID, and wherein the second UE radio capability information is encoded in an encoding format associated with the second RAT type.

7. The method of claim 5, wherein the UE radio capability ID is assigned by a manufacturer or a public land mobile network (PLMN), and wherein the encoding format of the UE radio capability information is one of a fifth generation system (5GS) format or an evolved packet system (EPS) format.

8. The method of claim 5, wherein the NF is a mobility management entity (MME) or an access and mobility management entity (AMF).

9. The method of claim 5, wherein a mapping between the UE radio capability ID and corresponding UE radio capability information is stored in the UCMF.

10. A user equipment radio capability management function (UCMF) in a wireless communication system, the UCMF comprising:

a transceiver; and a controller configured to:

receive, from a first network function (NF) associated with mobility management via the transceiver, a first request message for assigning a user equipment (UE) radio capability identity (ID), wherein the first request message includes UE radio capability information encoded in an encoding format associated with a radio access technology (RAT) type and information on the RAT type associated with the encoding format of the UE radio capability information, assign the UE radio capability ID associated with the RAT type to the UE radio capability information encoded in the encoding format, and transmit, to the first NF via the transceiver, the UE radio capability ID.

11. The UCMF of claim 10, wherein the controller is further configured to:

receive, from a second NF via the transceiver, a second request message for resolving a second UE radio capability ID, wherein the second request message includes the second UE radio capability ID and a second RAT type, identify second UE radio capability information corresponding to the second UE radio capability ID and the second RAT type, from mapping information between at least one UE radio capability information and corresponding UE radio capability ID, and transmit, to the second NF via the transceiver, the second UE radio capability information encoded in an encoding format associated with the second RAT type.

12. The UCMF of claim 10, wherein the UE radio capability ID is assigned by a manufacturer or a public land mobile network (PLMN), and wherein the encoding format of the UE radio capability information is one of a fifth generation system (5GS) format or an evolved packet system (EPS) format.

13. The UCMF of claim 10, wherein the controller is further configured to store a mapping between the UE radio capability ID and corresponding UE radio capability information.

14. A network function (NF) associated with mobility management in a wireless communication system, the NF comprising:

a transceiver; and a controller configured to:

transmit, to a user equipment radio capability management function (UCMF) via the transceiver, a first request message for assigning a user equipment (UE) radio capability identity (ID), wherein the first request message includes UE radio capability information encoded in an encoding format associated with a radio access technology (RAT) type and information on the RAT type associated with the encoding format of the UE radio capability information, and receive, from the UCMF via the transceiver, the UE radio capability ID assigned to the UE radio capability information encoded in the encoding format, wherein the UE radio capability ID is associated with the RAT type.

15. The NF of claim 14, wherein the controller is further configured to:

transmit, to the UCMF via the transceiver, a second request message for resolving a second UE radio capability ID, wherein the second request message includes the second UE radio capability ID and a second RAT type, and receive, from the UCMF via the transceiver, second UE radio capability information corresponding to the second UE radio capability ID, wherein the second UE radio capability information is obtained based on the second UE radio capability ID and the second RAT type from mapping information between at least one UE radio capability information and corresponding UE radio capability ID, and wherein the second UE radio capability information is encoded in an encoding format associated with the second RAT type.

16. The NF of claim 14, wherein the UE radio capability ID is assigned by a manufacturer or a public land mobile network (PLMN), and wherein the encoding format of the UE radio capability information is one of a fifth generation system (5GS) format or an evolved packet system (EPS) format.

\* \* \* \* \*